(No Model.) 3 Sheets—Sheet 1.

F. J. SPRAGUE.
DYNAMO ELECTRIC MACHINE.

No. 372,822. Patented Nov. 8, 1887.

ATTEST:

INVENTOR:
Frank J. Sprague
By Dyer & Seely
Attys (No Model.) 3 Sheets—Sheet 2.

F. J. SPRAGUE.
DYNAMO ELECTRIC MACHINE.

No. 372,822. Patented Nov. 8, 1887.

ATTEST:
E. P. Rowland
J. A. Hurdle

INVENTOR:
Frank J. Sprague
By Dyer & Seely
Attys (No Model.) 3 Sheets—Sheet 3.

F. J. SPRAGUE.
DYNAMO ELECTRIC MACHINE.

No. 372,822. Patented Nov. 8, 1887.

ATTEST:
E. Rowland
J. H. Hurdle

INVENTOR:
Frank J. Sprague
By Dyer & Seely
attys.

UNITED STATES PATENT OFFICE.

FRANK J. SPRAGUE, OF NEW YORK, N. Y., ASSIGNOR TO THE SPRAGUE ELECTRIC RAILWAY AND MOTOR COMPANY.

DYNAMO-ELECTRIC MACHINE.

SPECIFICATION forming part of Letters Patent No. 372,822, dated November 8, 1887.

Application filed March 3, 1885. Serial No. 157,698. (No model.)

*To all whom it may concern:*

Be it known that I, FRANK J. SPRAGUE, of New York, in the county and State of New York, have invented a certain new and useful Improvement in Dynamo-Electric Machines, of which the following is a specification.

This invention relates to a new form of winding for the armatures of dynamo-electric machines, which enables a greater quantity of wire to be placed upon an armature than any of the windings heretofore in use.

In my invention a hollow cylindrical armature-core is employed, and the wire is wound in cylinder-coils—that is, around the surface of this cylinder—and also in ring-coils—that is, coils wound upon and through the cylinder—all the cylinder and ring coils being arranged in a manner to be presently explained, and connected together so as to form a continuous series of coils.

My invention is illustrated in the accompanying drawings, in which—

Figure 1:
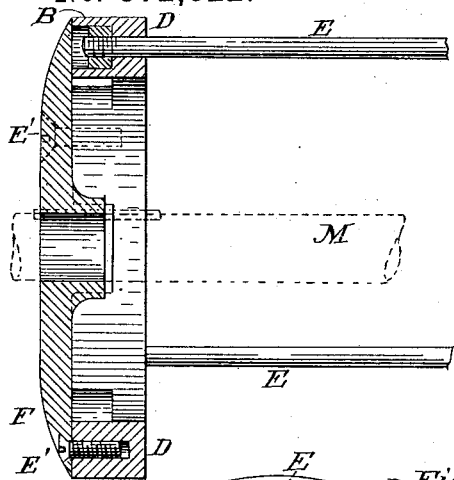
Figure 1:
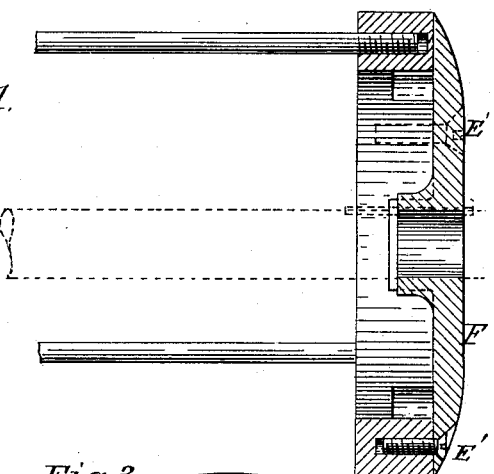
Figure 2:
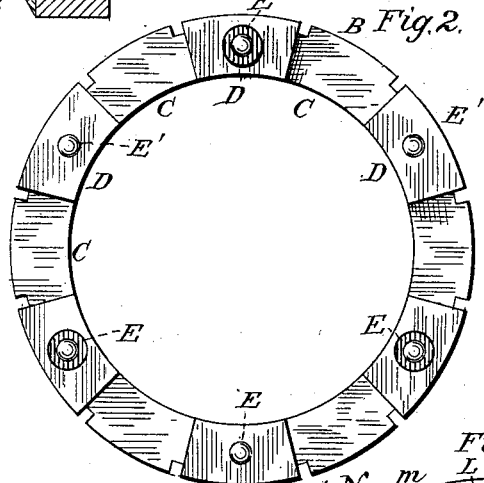
Figure 3:
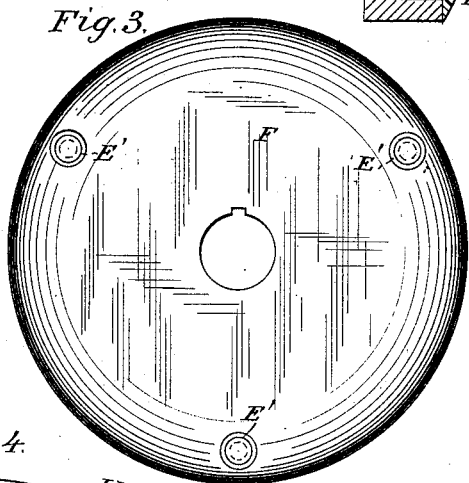
Figure 4:
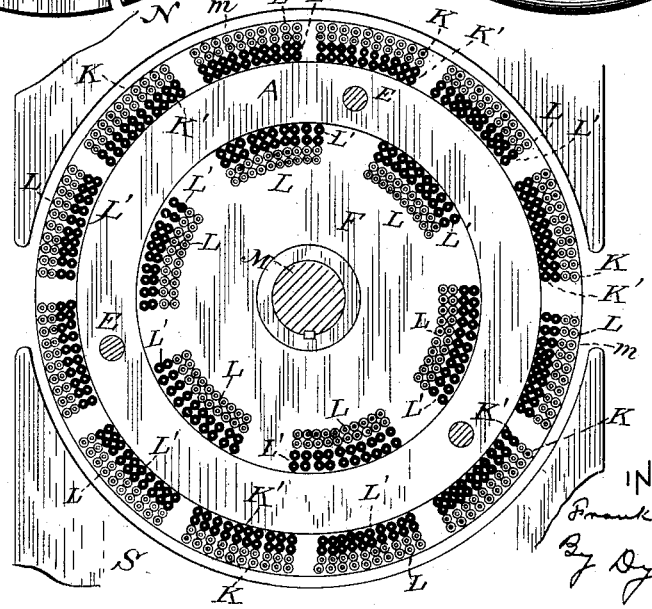
Figure 5:
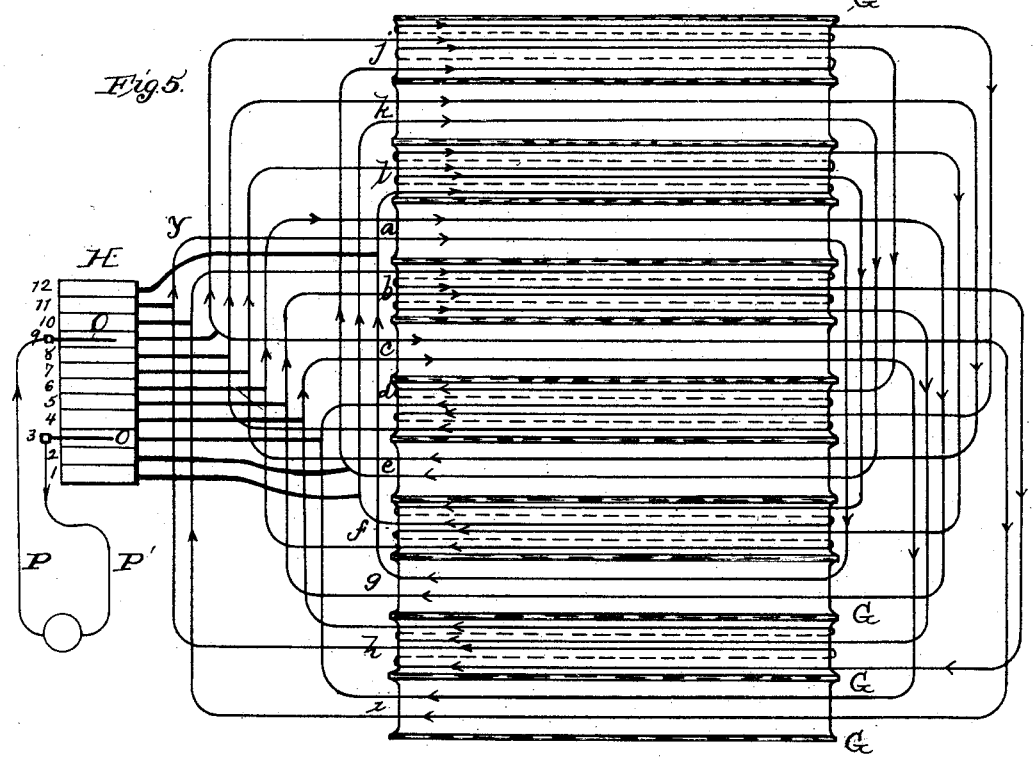
Figure 6:
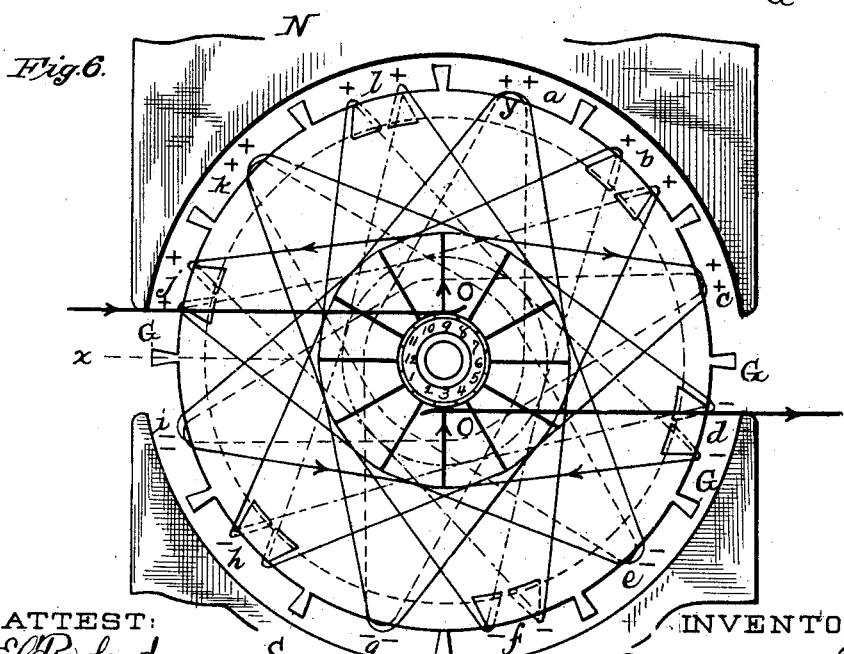
Figure 7:
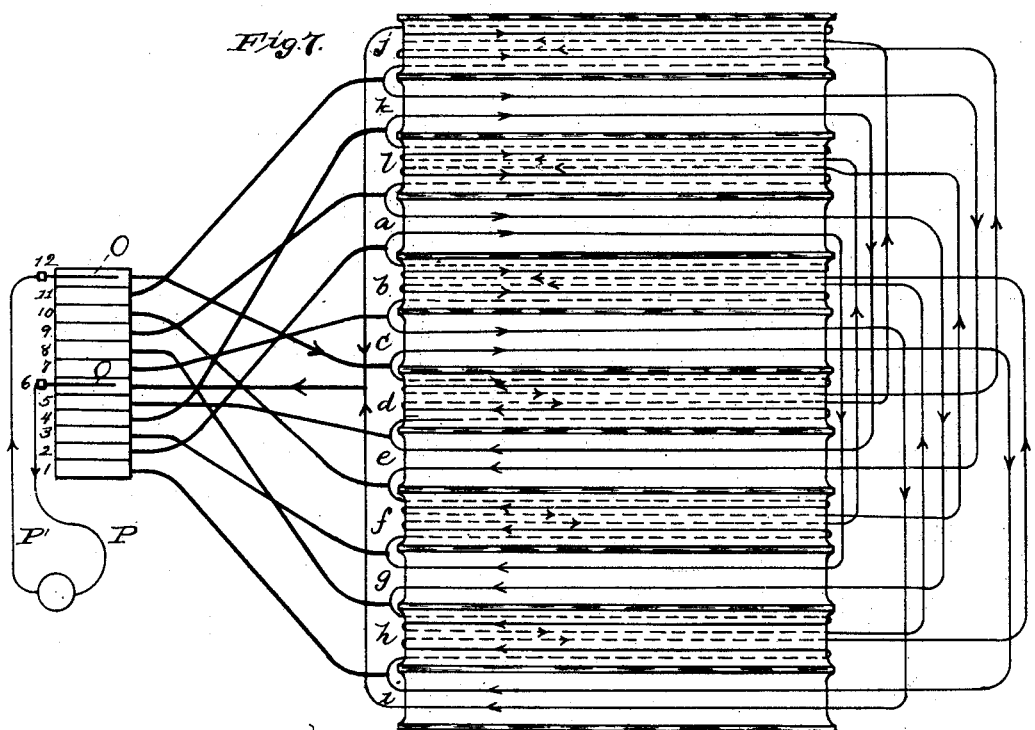
Figure 8:
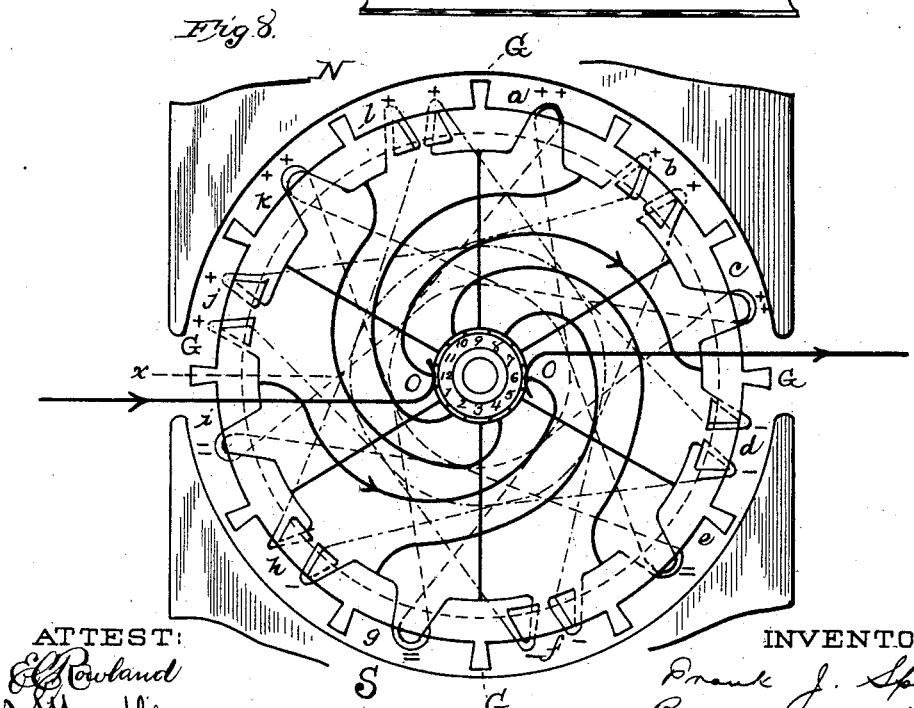

Figure 1 is a longitudinal section of the armature-core embodying my invention without the intermediate plates; Fig. 2, a view of one of the end rings of the core; Fig. 3, a view of one of the face-plates thereof; Fig. 4, a cross-section through the middle of the wound armature; Fig. 5, a diagram of the winding with the armature-core developed or laid out in flat form; Fig. 6, a diagram of the same winding seen at an end of the armature-cylinder; and Figs. 7 and 8 are views, similar to Figs. 5 and 6, of a modified form of winding.

I prefer to employ an armature-core built up of a number of thin sheet-iron rings or annular disks, A A, massed together. At each end of the series of flat rings is a thicker end ring, B, the outer surface of which is provided alternately with recesses or depressions C C and raised portions D D. The rings A and B are secured tightly together by bolts E E, passing through all said rings and having their ends countersunk in raised portions of the rings B B. A hollow cylinder is thus formed, and on this the ring-winding is placed, as will be set forth, filling the recessed portions of the end rings. At this time the ring-windings are in separate coils with their ends left free. Upon each end of the cylinder is then placed an iron face-plate, F, which plates are secured to the end rings, B B, by screws E' E', and which close the ends of the cylinder. Upon this cylinder are then wound the cylinder-coils, which are connected with the ring-coils in the manner which will be explained, so as to form a continuous series. These cylinder-coils occupy upon the surface of the cylinder the spaces between the ring-coils corresponding with the raised portions of the end plates.

Having thus described the simple mechanical construction of the armature, I will explain the arrangement of its coils, referring first to Figs. 5 and 6. In these figures ribs or projections are shown at G G, dividing the surface of the armature into sections. It is evident that these may in fact be actually used, they being formed by lugs on the core-rings; but I prefer to dispense with them in practice, and have shown them for convenience of explanation only. The surface of the armature-cylinder is thus shown in twelve divisions, which are lettered from *a* to *l*. The commutator H has a like number of bars numbered from 1 to 12. The lines crossing the surface of the cylinder represent the coils, and the arrow-heads show the direction of the current therein. The lines are dotted where they pass inside the cylinder in Fig. 5 and where they cross the farther end of the cylinder in Fig. 6.

In Fig. 5 the cylinder is cut and laid open at *x* of Fig. 6.

To describe the winding, I may begin at the point marked *y* and follow the coils on Fig. 5. The first coil is placed upon section *a* and then brought around the end of the cylinder and back along the diametrically-opposite section *g*, and connection is then made to commutator-block 12. The coil then goes to section *l*, where it forms a ring-coil, then to the diametrically-opposite section, *f*, where it is an oppositely-wound ring-coil, and connection is then made to the next commutator-block, 1. There is next a cylinder-coil on *k* and *e*, connection to bar 2, opposite ring-coils on *j* and *d*, and connection to bar 3; cylinder-coil on *i* and *c*, connection to bar 4; ring-coils on *h* and *b*, connection to bar 5; cylinder-coil on *g* and *a* opposite to that previously wound here, and connection to bar 6; ring-coils on *f* and on *l* opposite to those previously wound in said sections, and connection to bar 7; cylinder-coil on $e\,k$, connection to bar 8; ring-coils on $d$ and on $j$, connection to bar 9; cylinder-coil on $c\,i$, connection to bar 10; ring-coils on $b$ and on $h$, connection to bar 11, which is the point from which we started. From this it will be seen that the winding consists of, first, a cylinder-coil and then two oppositely-wound ring-coils on opposite sides of the armature, then another cylinder-coil two divisions removed from the first, and then two more ring-coils opposite to each other, and each one division removed from the last cylinder half-coil, and so on, each coil being one division removed from the preceding one, while the junction between each cylinder-coil and the adjacent pairs of ring-coils has a connection to a commutator-bar, and all are connected continuously together. The unit of winding is either a cylinder-coil or a pair of opposite ring-coils.

The generation of current is similar to that of other continuously-wound dynamos, the current, as shown by the arrows, being in one direction in one half the coils and in the other direction in the other half.

As stated, the ring-coils are wound first separately and then the cylinder-coils, and each cylinder-coil is then connected between two adjacent pairs of ring-coils.

In Fig. 6 the sections of the armature and of the commutator are lettered and numbered, respectively, as in Fig. 5. The dotted lines show diagrammatically where the coils pass across the other end of the cylinder, while the full lines show their course across the front end. From this it may be more readily seen that each cylinder-coil is wound upon diametrically-opposite parts of the cylinder, and also that the two coils of each pair of ring-coils are wound on diametrically or nearly diametrically opposite parts of the armature.

The winding shown in Figs. 7 and 8 differs somewhat from that just described, the difference being that after winding a cylinder-coil, instead of going back to the other side of the cylinder again to begin the first ring-coil on a section adjacent to the first cylinder half-coil, as before, I wind the first ring-coil on the section immediately adjacent to the last half of the cylinder-coil and then go back to the diametrically-opposite section adjacent to that on which the first half of the cylinder-coil lies to wind the other ring-coil of the pair. Beginning at $a$, for instance, the cylinder-coil is wound on $a\,g$, and the ring-coils then first on $f$ and then on $l$, cylinder-coil then on $k\,e$, and ring-coils on $d$ and $j$, and so on. The commutator-connections are the same as before—that is, there is a connection at each end of each cylinder-coil at the junctions of such coil with the pairs of ring-coils connected at both ends thereof.

While in the diagrams a single line represents each coil, it is evident that each cylinder or ring coil may be, and preferably is, composed of a number of turns of wire, as seen in Fig. 4, wherein K and K′ are the cylinder-coils and L and L′ the ring-coils. There being two coils on each division of the armature, the wires of one coil are shaded black, while those of the other are left plain in each division for the purpose of distinguishing them.

The armature-shaft M is attached to the armature only at the face-plates F F, which are keyed to the shaft, as shown. A band, $m$, is shown to secure the coils upon the cylinder.

N S represent the poles of the field-magnet of the machine. O O are commutator-brushes, and P P′ are conductors of the external or working circuit.

It will be seen that by my invention I am enabled to wind a greater quantity of wire upon an armature than has been allowed by any cylinder or ring winding heretofore employed. In any ordinary cylinder-winding, when a large number of coils are wound on the surface of the cylinder, there is a great mass of wires at the ends of the cylinder, and consequently danger of heating and of crossing wires at the ends, while in an ordinary ring-winding, where a great number of coils are used, they are crowded together on the inside of the ring with a similar effect. In my winding, however, while the whole surface of the cylinder is covered with wire, only those on alternate divisions of the cylinder are carried across the ends thereof and only the alternating ring-coils are brought inside the cylinder, where there is plenty of room for each coil to lie by itself. My winding is hence especially suitable for high electro-motive-force machines.

What I claim is—

1. The combination, with the armature-core of a dynamo-electric machine, of ring-coils and cylinder-coils wound thereon and connected into a continuous series, all the coils being in series with one another joined at intervals to separate commutator-bars, substantially as set forth.

2. The combination, with the armature-core of a dynamo-electric machine, of ring-coils and cylinder-coils connected alternately together into a continuous series, all the coils being in series with one another, and connections from said series at intervals to separate commutator-bars, substantially as set forth.

3. The combination, with the armature-core of a dynamo-electric machine, of coils arranged in the following manner: first a cylinder-coil, then two ring-coils on opposite parts of the core, then another cylinder-coil, and so on, all said coils being connected into a continuous series, substantially as set forth.

4. The combination, with the armature-core of a dynamo-electric machine, of coils arranged and connected as follows: first a cylinder-coil, then two ring-coils on opposite parts of the core, then another cylinder-coil, and so on, all said coils being connected into a continuous series and said series being joined to separate commutator-bars between each cylinder-coil and the adjacent pairs of ring-coils, substantially as set forth.

5. The combination, with the armature-core of a dynamo-electric machine, of cylinder-coils and pairs of ring-coils alternating therewith, the coils of each pair being wound oppositely, and all said cylinder and ring coils being connected into a continuous series connected at intervals to separate commutator-bars, substantially as set forth.

6. The combination, with a hollow cylindrical armature-core, of ring-coils wound thereon, a face-plate at each end of the core outside of said ring-coils closing the cylinder, and coils wound on the outside of said cylinder, substantially as set forth.

7. The combination, with the hollow cylindrical armature-core, of the end rings having alternate raised portions and depressions, the ring-coils wound in said depressions, the face-plates, and the coils wound on the outside of the cylinder, substantially as set forth.

8. The combination, in an armature-core, of a series of thin disks or rings, a thicker disk at each end, a face-plate at each end, ring-coils wound on the core under the face-plates, and cylinder-coils wound over said face-plates, all said plates and disks being secured together, substantially as set forth.

9. The combination, with the armature-shaft, of the armature-core composed of a series of rings and a face-plate at each end of said series, said face-plates being secured to the shaft, ring-coils wound on the core under the face-plates, and cylinder-coils wound over said face-plates, substantially as set forth.

This specification signed and witnessed this 12th day of February, 1885.

FRANK J. SPRAGUE.

Witnesses:
A. W. KIDDLE,
E. C. ROWLAND.